United States Patent [19]

Iida et al.

[11] Patent Number: 4,601,950
[45] Date of Patent: Jul. 22, 1986

[54] MAGNETIC RECORDING MEDIUM AND MANUFACTURING METHOD THEREOF

[75] Inventors: Tamaki Iida, Higashikurumei; Kaname Inoue, Kawasaki, both of Japan

[73] Assignee: Shin-Etsu Chemical Co., Ltd., Tokyo, Japan

[21] Appl. No.: 774,449

[22] Filed: Sep. 10, 1985

[30] Foreign Application Priority Data

Sep. 10, 1984 [JP] Japan ................ 59-189244

[51] Int. Cl.$^4$ ................ G11B 5/72
[52] U.S. Cl. ................ 428/421; 360/134; 360/135; 360/136; 427/41; 427/128; 427/131; 427/132; 428/422; 428/447; 428/694; 428/695; 428/900
[58] Field of Search ........... 427/41, 128, 131, 132; 428/694, 695, 900, 447, 422, 421; 360/134-136

[56] References Cited

U.S. PATENT DOCUMENTS

| | | | |
|---|---|---|---|
| 4,380,558 | 4/1983 | Yanagisawa | 428/695 |
| 4,419,404 | 12/1983 | Arai | 428/41 |
| 4,429,024 | 1/1984 | Ueno | 427/41 |
| 4,521,482 | 6/1985 | Arai | 428/412 |
| 4,529,659 | 7/1985 | Hoshino | 428/694 |
| 4,557,948 | 12/1985 | Yamamoto | 427/131 |
| 4,565,734 | 1/1986 | Arai | 428/900 |

Primary Examiner—Ellis P. Robinson
Attorney, Agent, or Firm—Wenderoth, Lind & Ponack

[57] ABSTRACT

A manufacturing method for a magnetic recording medium is disclosed which comprises the steps of forming a metallic magnetic layer on a non-magnetic substrate such as a polyester film with or without a non-magnetic metal layer deposited thereon by a method of electroless plating or electroplating, forming a vapor-phase plasma-polymerized layer of a silane compound, e.g. 1,1,2,2-tetramethyl disilane and 1,1,2,2,3,3-hexamethyl trisilane, and forming a thin layer of a fluorocarbon resin. The thus manufactured magnetic recording medium has advantages in several properties such as the surface lubricity sufficient to give satisfactory smoothness of travelling, durability in abrasion resistance and weatherability.

5 Claims, 1 Drawing Figure

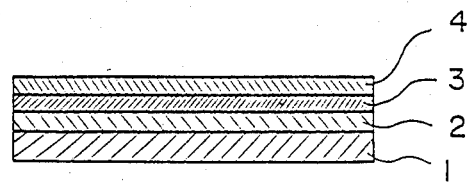
FIGURE

MAGNETIC RECORDING MEDIUM AND MANUFACTURING METHOD THEREOF

BACKGROUND OF THE INVENTION

The present invention relates to a megnetic recording medium and a manufacturing method thereof or, more particularly, the invention relates to a magnetic recording medium having remarkably improved properties such as durability, smooth travelling, weatherability or anti-oxidation resistance and the like manufactured by forming successively a protective layer of a polymer formed by plasma-polymerization of a silane compound and then a lubricating layer of a fluorinated resin on the surface of a metallic magnetic layer.

Heretofore various types of magnetic recording media such as rigid and flexible magnetic recording discs and the like are under development as one of the peripheral devices along with recent development of computers. In recent years, in compliance with the requirement of high-density recording, attention has been concentrated on several types of magnetic recording media of non-binder type including a thin metallic magnetic layer as the magnetic recording element formed by either one of the dry-process vapor-deposition methods including vacuum deposition, sputtering and ion-plating or one of the wet-process metal-plating methods including electroplating, electroless plating and the like, and a great deal of efforts are being directed to this type of magnetic recording media with a desire to bring these recording media into practical use.

There are two classes of the methods for forming a thin metallic magnetic layer on a substrate such as polyester films and the like including the vapor-deposition methods such as vacuum deposition, sputtering, ion-plating and the like and the metal-plating methods such as electroplating, electroless plating and the like. Each of the vapor-deposition methods has several disadvantages such as the low productivity because the manufacturing system is necessarily batch-wise due to the nature of the process which is carried out in a vacuum atmosphere if not to mention the large cost of power consumption for maintaining the atmosphere of vacuum. On the contrary, the methods of metal-plating have an advantages in energy-saving and in productivity since the process is carried out under atmospheric pressure.

On the other hand, the inventors have previously proposed a method of forming a polymer layer having lubricity as the protective layer on various kinds of substrates by the application of a method of plasma-induced vapor-phase deposition using a gaseous mixture composed of amethylhydrogen polysilane and oxygen. The method easily provides a hard layer with lubricity containing silicon carbide and silanol groups and the thin layer exhibits a hydrophilicity on the surface due to the silanol groups contained therein and advantageous results are obtained in the adhesive bonding and wetting of the lubricating layer.

The inventors of the present invention have attained to the present invention after studies on the application of such a thin layer as the protective layer for the thin metallic magnetic layer prepared by the aforementioned metalplating method.

SUMMARY OF THE INVENTION

The present invention has an object to provide a megnetic recording medium formed by successively and integrally overlaying, on the surface of a substrate, a metallic magnetic layer, a polymer layer formed by the plasma-polymerization of a silane compound and a layer of a fluorocarbon resin. The invention further has an object to provide a manufacturing method of such a magnetic recording medium comprising the steps of forming a me-tallic magnetic layer on a substrate by electroless plating or electroplating, forming a polymer layer thereon by the plasma-polymerization of a silane compound applying the vapor-phase plasma-deposition method, and further forming a thin layer of a fluorocarbon resin on the plasma-polymerized layer.

According to the present invention, a great advantage is obtained in the performance of the protective layers for the metallic magnetic layer including the durability and the weatherability or the anti-oxidation resistance owing to the facts that a plasma-polymerized layer of a silane compound is formed uniformly with firm bonding to the metallic magnetic layer by the vapor-phase plasma-deposition method and the polymer layer is composed mainly of silicon carbide containing silanol groups, and at the same time a layer of a fluorocarbon resin is formed on and firmly bonded to this polymer layer so that great improvements are obtained in the travelling behavior and durability of the magnetic recording medium.

The magnetic recording medium of the present invention comprises a substrate, a metallic magnetic layer, a plasma-polymerized layer of a silane compound and a layer of a fluorocarbon resin, the layers being successively and integrally overlaid on the substrate surface.

The method of the invention for the preparation of the above described magnetic recording medium comprises the successive steps of:

(a) forming a metallic magnetic layer on a substrate by the method of electroplating or electroless plating;

(b) forming a plasma-polymerized layer on the metallic magnetic layer by a vapor-phase plasma-deposition method using a silane compound as the plasma-supporting gas; and (c) forming a layer of a fluorocarbon resin on the plasma-polymerized layer of the silane compound.

In the above described method for the preparation of a magnetic recording medium, it is preferable that the silane compound is a methylhydrogen polysilane represented by the general formula $$(CH_3)_a Si_b H_c, \qquad (I)$$

in which the suffixes a, b and c are each a positive integer satifying the following equations and inequalities:

$1 < b < 4;$ $a + 1 \leq 2b + 1;$ $1 < c \leq 2b + 1;$ and $a + c = 2b + 2.$

BRIEF DESCRIPTION OF THE DRAWING

The FIGURE is a schematic illustration of a cross section of the magnetic recording medium according to the invention.

DETAILED DESCRIPTION OF THE PREFERRED EMBODIMENTS

As is illustrated in the FIGURE of the accompanying drawing by the cross section, the magnetic recording medium according to the present invention is prepared by successively overlaying and integrating, on the surface of a substrate 1, a metallic magnetic layer 2, a plasma-polymerized layer 3 of a silane compound and a layer of a fluorocarbon resin 4.

The material of the substrate 1 should be non-magnetic and the material is, for example, a non-magnetic metal such as copper, aluminum and the like or a composite sheet material prepared by forming a layer of a non-magnetic metal on the surface of a film of a synthetic resin such as polyester, polyimide, polyphenylene sulfide and the like by means of a known method such as electroless plating, electroplating, vaccum deposition, sputtering and the like.

A metallic magnetic layer 2 is formed on the above mentioned substrate 1 using cobalt-phosphorus, cobalt-nickel-phosphorus and the like by the method of electroless plating or electroplaing. The plating bath should contain the necessary components including, for example, cobalt chloride, cobalt sulfate, nickel chloride, nickel sulfate, sodium hypophosphite and others. The preferred thickness of the thus formed plating layer, i.e. the metallic magnetic layer, is usually in the range from 0.1 to 2 $\mu$m or, preferably, from 0.5 to 1 $\mu$m in consideration of the possibility of high-density magnetic recording, surface smoothness and higher degree of orientation of the magnetic domains.

Then, a plasma-polymerized layer 3 of a silane compound is formed on the thus formed metallic magnetic layer 2 by the vapor-phase plasma-deposition method. The silane compound is preferably used as a mixture with oxygen gas, and a plasma-polymerized layer 3 is formed on the metallic magnetic layer 2 formed on the substrate 1 which is placed in a plasma chamber for performing the vapor-phase plasma-deposition method using the gaseous mixture of a silane compound and oxygen gas. The molar mixing ratio of the silane compound to oxygen should be in the range from 1:0.5 to 1:8 or, preferably, from 1:1 to 1:3. The plasma can be generated in the plasma chamber by impressing a high-frequency electric power keeping the pressure inside the plasma chamber at 1 torr or lower. The preferred thickness of the plasma-polymerized layer of the silane compound is usually in the range from 0.01 to 0.5 $\mu$m or, preferably, from 0.02 to 0.1 $\mu$m and the thickness of less than 0.01 $\mu$m would produce a difficulty in obtaining sufficient smoothness on the surface of the protective layer. Even a plasma-polymerized layer with a thickness exceeding 0.5 $\mu$m would not produce any additionally advantageous effect but rather produce inconveniences in recording on and playback of the recording medium because of the increased spacing between the magnetic layer and the magnetic head.

By mixing oxygen gas with the silane compound for forming the polymer layer 3 in the above mentioned vapor-phase plasma-deposition method, an improvement is obtained in preventing surface oxidation, corrosion and the like at the cut ends of the magnetic layer in the section formed by punching from a continuoue-length sheet material in the manufacture of flexible discs.

The preferred silane compound used in the present invention is a methylhydrogen polysilane represented by the general formula (I) given before. Exemplary of such a methylhydrogen polysilane are the compounds shown by the following formulas, denoting a methyl group with a symbol Me:

1,1,2,2-tetramethyl disilane of the formula H-SiMe$_2$-SiMe$_2$-H;

1,2,2-trimethyl disilane of the formula Me-SiH$_2$-SiMe$_2$-H;

1,2-dimethyl disilane of the formula Me-SiH$_2$-SiH$_2$-Me;

mehyl disilane of the formula Me-SiH$_2$-SiH$_3$;

1,1,2,2,3,3-hexamethyl trisilane of the formula H-SiMe$_2$-SiMe$_2$-SiMe$_2$-H;

1,1,2,3,3-pentmethyl trisilane of the formula H-SiMe$_2$-SiHMe-SiMe$_2$-H;

1,1,3,3-tetramethyl trisilane of the formula H-SiMe$_2$-SiH$_2$-SiMe$_2$-H;

1,2,3-trimethyl trisilane of the formula Me-SiH$_2$-SiHMe-SiH$_2$-Me;

1,3-dimethyl trisilane of the formula Me-SiH$_2$-SiH$_2$-SiH$_2$-Me;

and 2,2-dimethyl trisilane of the formula H$_3$Si-SiMe$_2$-SiH$_3$.

These methylhydrogen polysilanes may be used either singly or as a mixture of two kinds or more according to need.

Then, the layer of a fluorocarbon resin 4 is formerd on the polymer layer 3 obtained by the vapor-phase plasma-deposition method in order to produce a satisfactory smoothness of travelling. The preferred fluorocarbon resins used in this process are those having thermal resistance and chemical stability such as a perfluoroalkyl polyether represented by the formula

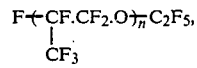

in which n is a positive integer from 10 to 60.

The preferred method of forming a layer 4 using a fluorocarbon resin is to apply a diluted solution of the above mentioned fluorocarbon resin in a suitable solvent such as Freon 113 and the like by spraying, dipping or other suitable techniques. The thickness of the layer 4 is usually in the range from 0.01 to 0.2 $\mu$m or, preferably, from 0.03 to 0.08 $\mu$m.

Furthermore, subsequent buffing with a nonwoven fabric, wooly cloth and the like after application of the resin solution has an effect to prevent segregation of the fluorcarbon resin and to increase the surface lubricity of the layer of the fluorocarbon resin.

In the following, examples are to illustrate the present invention in more detail.

EXAMPLE 1

A polyester film having a thickness of about 75 $\mu$m having been subjected to the surface treatment of roughening and activation was plated with copper in a procedure of electroless plating by dipping in a copper sulfate solution until a copper plating layer having a thickness of about 0.5 $\mu$m was obtained and then electrolytically plated with copper to such an extent that the increment in the thickness of the copper plating layer was about 8 $\mu$m.

Then the copper-plated polyester film was dipped in a bath of a solution for cobalt alloy plating containing cobalt sulfate, nickel sulfate and sodium hypophosphite to form a thin layer of a cobalt alloy of Co-Ni-P as the metallic magnetic layer having a thickness of about 0.8 μm on the copper layer.

The film provided with the metallic magnetic layer was placed in a plasma chamber equipped inside with a pair of electrodes for discharging, and a gaseous mixture composed of 1,1,2,2-tetramethyl disilane and oxygen gas in a molar ratio of 1:2 was introduced into and passed through the chamber while keeping the inside pressure of the chamber controlled at 0.1 torr after evacuation to $5 \times 10^{-2}$ torr. A plasma-polymerized layer having a thickness of about 0.2 μm was formed on the thin magnetic layer of the film by the vapor-phase plasma-deposition reaction with glow discharge when a high-frequency electric power of 30 watts at a frequency of 13.56 MHz was impressed between the electrodes while maintaining the atmospheric conditions as described above.

Further, a lubricating layer having a thickness of about 0.3 μm was formed on the surface of the plasma-polymerized layer of the silane compound by coating with a solution of perfluoroalkyl polyether in Freon 113 in a concentration of about 0.3% by weight and drying followed by buffing of the thus coated surface with a nonwoven fabric.

Examination was carried out as shown below of the thus prepared magnetic recording medium for the items of (1) the initial coefficient of kinetic friction, (2) abrasion resistance and (3) weatherability and, in parallel, visual inspection was performed for (4) the appearance after the weathering test and (5) the surface condition of the presser head after the abrasion resistance test to give the results shown in Table 1 to follow. The testing procedures of the above mentioned items were as described below.

(1) Initial coefficient of kinetic friction: the coefficient of kinetic friction was determined of a specimen in an ambience at a temperature of 23°±2° C. with a relative humidity of 40 to 60% after standing for at least 24 hours prior to the test.

(2) Abrasion resistance: a specimen kept for at least 24 hours prior to the test in an ambience at a temperature of 23°±2° C. with a relative humidity of 40 to 60% was subjected to the determination of the coefficient of kinetic friction after 1,000,000 times revolution of a presser head having a contacting area of 280±10 mm² pressed down under a force of 0.70±0.05 N at a rate of 300±7 rpm.

(3) Weatherability: the coefficient of kinetic friction was determined of a specimen kept for 72 hours in an ambience at a temperature of 50°±3° C. with a relative humidity of 80% and then transferred into and kept for 72 hours in an ambience at a temperature of 0°±3° C. with a relative humidity not exceeding 20% followed by standing for 24 hours as exposed to the atmospheric air.

EXAMPLE 2

The experimental procedure was substantially the same as in Example 1 except that the 1,1,2,2-tetramethyl disilane was replaced with 1,1,2,2,3,3-hexamethyl trisilane and the molar mixing ratio of the silane to oxygen was 1:2.5 instead of 1:2. The results of the tests are also shown in Table 1.

COMPARATIVE EXAMPLE

A magnetic recording medium was prepared by providing a protective layer of silicon dioxide having a thickness of about 0.2 μm by use of a spinner on the metallic magnetic layer of Co-Ni-P formed on a copper-plated substrate prepared in a similar manner to the preceeding Examples and then the surface of the silicon dioxide layer was coated with a conventional silicone fluid to form a lubricating layer having a thickness of about 0.03 μm.

The thus prepared comparative magnetic recording medium was tested in the same procedures as in Examples given above to give the results shown in Table 1.

As is understood from the results shown in Table 1, it is apparent that the magnetic recording medium according to the present invention is much more resistant against deterioration in respect of the kinetic friction and is excellent in the durability, smoothness of travelling and weatherability.

TABLE 1

| | | Example 1 | Example 2 | Comparative Example |
|---|---|---|---|---|
| Coefficient of kinetic friction | Initial | 0.05 | 0.04 | 0.06 |
| | After abrasion resistance test | 0.07 | 0.07 | 0.17 |
| | After weatherability test | 0.09 | 0.07 | 0.30 |
| Appearance after weatherability test | | Good | Good | Partly discolored |
| Surface condition of presser head | | Almost unchanged | Almost unchanged | Scratches |

What is claimed is:

1. A magnetic recording medium which comprises a substrate and layers successively formed thereon comprising a metallic magnetic layer, a plasma-polymerized layer of a silane compound and a fluorinated resin layer.

2. A method for the preparation of a magnetic recording medium formed of a substrate and layers successively formed thereon comprising a metallic magnetic layer, a plasmapolymerized layer of a silane compound and a fluorinated resin layer which comprises the successive steps of: (a) forming a metallic magnetic layer on the substrate by a method of electroplating or electroless plating: (b) forming a plasma-polymerized layer of a silane compound on the metallic magnetic layer by a vapor-phase plasma-deposition method in an atmosphere containing the silane compound, and (c) forming a layer of a fluorocarbon resin on the plasma-polymerized layer.

3. The method for the preparation of a magnetic recording medium as claimed in claim 2 wherein the silane compound is a methylhydrogen polysilane represented by the general formula $$(CH_3)_a Si_b H_c, \quad (I)$$

in which the suffixes a, b and c are each a positive integer satisfying the equations and inequalities:

$$1 < b < 4;$$

$$a + 1 \leq 2b + 1;$$

$$1 < c \leq 2b + 1; \text{ and}$$

$$a + c = 2b + 2.$$

4. The method as claimed in claim 3 wherein the silane compound is selected from the group consisting of 1,1,2,2-tetramethyl disilane, 1,2,2-trimethyl disilane, 1,2-dimethyl disilane, mehyl disilane, 1,1,2,2,3,3-hexamethyl trisilane, 1,1,2,3,3-pentmethyl trisilane, 1,1,3,3-tetramethyl trisilane, 1,2,3-trimethyl trisilane, 1,3-dimethyl trisilane and 2,2-dimethyl trisilane.

5. The method as claimed in claim 4 wherein the silane compound is 1,1,2,2-tetramethyl disilane or 1,1,2,2,3,3-hexamethyl trisilane.

* * * * *